United States Patent [19]

Soerensen et al.

[11] 4,091,506
[45] May 30, 1978

[54] FISH CLEANING MACHINE AND METHOD

[75] Inventors: Ejnar Soerensen; Lars Svanborg, both of Viborg, Denmark

[73] Assignee: Ejnar Soerensen, Denmark

[21] Appl. No.: 592,358

[22] Filed: Jul. 1, 1975

[30] Foreign Application Priority Data

Jul. 4, 1974 United Kingdom .............. 29625/74

[51] Int. Cl.² ............................................. A22C 25/16
[52] U.S. Cl. .......................................... 17/52; 17/56; 17/58
[58] Field of Search .................. 17/52, 45, 58, 59, 54, 17/55, 61, 57

[56] References Cited

U.S. PATENT DOCUMENTS

| 1,267,850 | 5/1918 | Cooper | 17/58 |
| 3,264,681 | 8/1966 | Bartels | 17/52 |
| 3,510,910 | 5/1970 | Erkins | 17/52 |

FOREIGN PATENT DOCUMENTS 6,909,615 12/1970 Netherlands ............................ 17/58

311,603 10/1971 U.S.S.R. .................................. 17/58

Primary Examiner—Louis G. Mancene
Assistant Examiner—John J. Wilson
Attorney, Agent, or Firm—Craig & Antonelli

[57] ABSTRACT

A method of automatically cleaning fishes of the type to be sold with the head of the fish remaining on the fish body, comprising the steps of providing a first cross incision in the lower body portion approximately along the rear edge of the gill blades and a second cross incision in the lower head portion, providing a longitudinal incision along the underside of the fish body behind the said first cross incision so as to open the belly of the fish and removing the gills and entrails from the opened belly, said second cross incision being made subsequently to said first cross incision so as to cut the lower ends of the gill archs and the clavigulae approximately where these are joined to the tongue arch (urohyale) of the fish, whereafter, upon the belly being opened, the gills and the entrails are gripped and removed from the fish by means of a suction nozzle.

23 Claims, 8 Drawing Figures

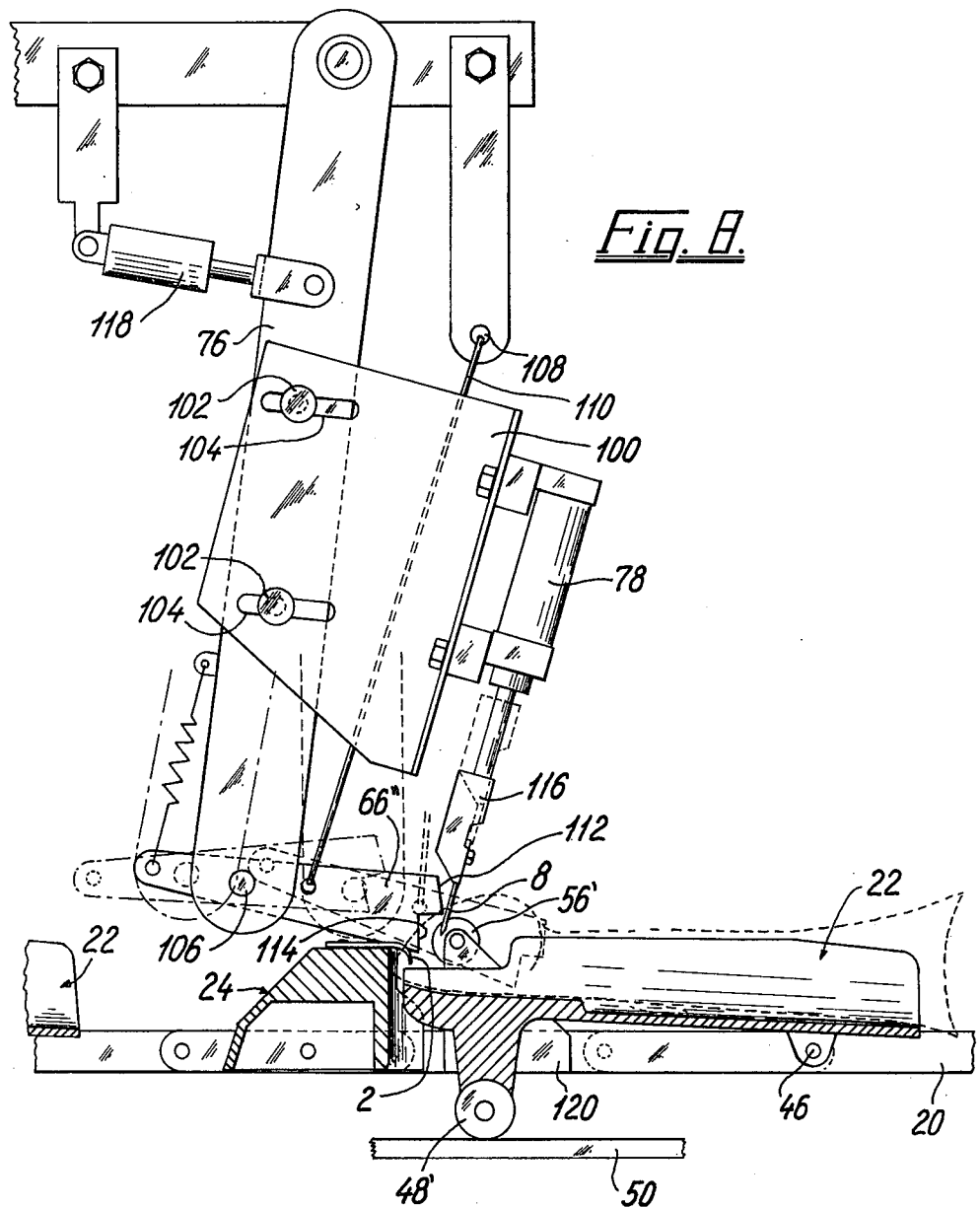

FISH CLEANING MACHINE AND METHOD

The present invention relates to a method of automatically cleaning of fishes of the type to be sold with their heads remaining on the fish body, e.g. trouts and smoked mackerels, comprising the steps of providing a first cross incision in the lower body portion approximately along the rear edges of the gill cover blades and a second cross incision in the lower head portion, providing a longitudinal incision along the underside of the fish body behind the first cross incision so as to open the belly of the fish, and removing the gills and entrails from the opened body. In most cases the cleaning is done manually, but machines have been developed for the purpose. In the known machines the fishes are placed on an intermittently advancing conveyor belt, the operator hooking the fish onto holding hooks on the belt with the fish back facing the belt, i.e. with the belly side exposed for treatment in a number of consecutive treating stations passed by the conveyor. In a first station there is made simultaneously the said first and second cross incisions, of which the first incision serves to cut the rear gill portions or edges free of the body portions to which they are attached and to provide a large opening enabling the means for opening the belly to get easy access to the belly wall, while the second incision serves to provide a hole in the bottom portion of the fish mouth for facilitating the later operation of the gill removing means. In a following station the belly is cut open along a central longitudinal line and the fillets are forced sideways away from each other whereby the entrails are exposed. in the known machines, in order to remove the gills, there is used a movable gripping jaw which in an open position is swung into contact with the lower end of the gill archs through the hole provided by the said second incision whereafter the jaw is mechanically closed and moved downstream of the fish so as to pull away the gills and entrails therefrom. However, practice shows that this is a very unsafe method of cleaning the fish, because it is more or less a matter of luck whether the gripping jaws actually get hold in the gills and entrails. Normally it cannot be expected that more than 50% of the fish gets cleaned and less than that totally cleaned, so at the delivery end of the machine there must be sitting several controllants manually cleaning and aftercleaning the major part of the fishes. The known method is connected with some further disadvantages, i.e. that the said cross cutting is liable to damage the lower side of the fish head, because it is made relatively close to the front end of the head.

It is the general purpose of this invention to provide an improved fish cleaning method and a more specific purpose to provide a method and a machine enabling the cleaning to be accomplished with highly improved efficiency without causing unnecessary damage to the fish. A further, important purpose is to provide a machine which is operable in a continuous, non-intermittent manner.

According to the invention the second cross incision is made subsequently to the first cross incision so as to cut the lower ends of the gill archs and the clavigulae approximately where these are joined to the tongue arch (urohyale) of the fish, whereafter, upon the belly being opened, the gills and entrails are gripped and removed from the fish. The second incision is made slightly behind the second incision according to the known method, whereby the fish head is not or at least less damaged and whereby the gill archs are effectively cut free of the tongue arch, so that thereafter the gills and entrails are easily removable without requiring to be torn off from the tongue arch, and the removing means may thus operate with high efficiency, because they need not grasp the entrails very firmly in order to remove them from the fish.

According to an important aspect of the invention the gills and entrails may hereby even be removed by means of a suction nozzle which is moved relatively to the fish lengthwise of the opened belly in operative engagement with the gills and entrails. This will promote a safe removal because the exact place of the first contact between the entrails and the removing means will be by far less important than in case of mechanical gripping means and besides the complicated control system of the mechanical gripping means is entirely avoided.

The invention also comprises a machine for carrying out the method, as defined in the appended claims. Preferably the machine is made so as to work in a continuous, non-intermittent manner.

In the following the invention is described in more detail with reference to the accompanying drawing, in which:

FIG. 8 is a side view of a modified station thereof.

In carrying out the method of the present invention the fish is placed on its back on a straight support (not shown in FIGS. 1–4), and a pointed holding member 2 is pressed against the underside of the front portion of the lower jaw of the fish, whereby due to the downward rounding of the top side of the head towards its front end, the entire head portion will be urged against the straight support so that a pulling tension will occur along the lower side of the head. In FIGS. 1 to 4 the fish is shown with its mouth open, but it will be understood that due to the clamping action of the holding member 2 towards the support surface the mouth of the fish will of course be closed.

Figure 1:
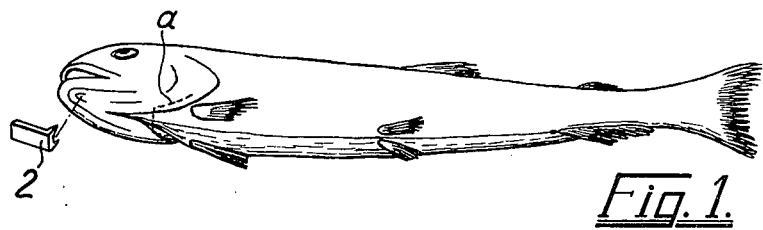
FIGS. 1–4 illustrate the fish cleaning method according to the invention
Figure 2:
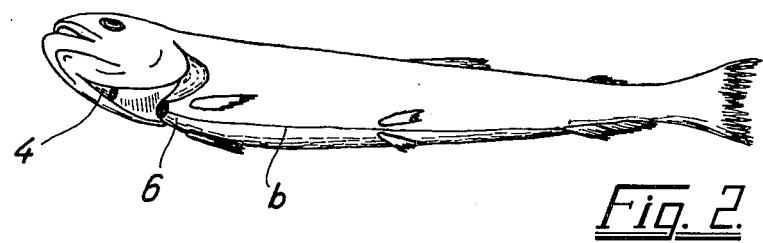
Figure 3:
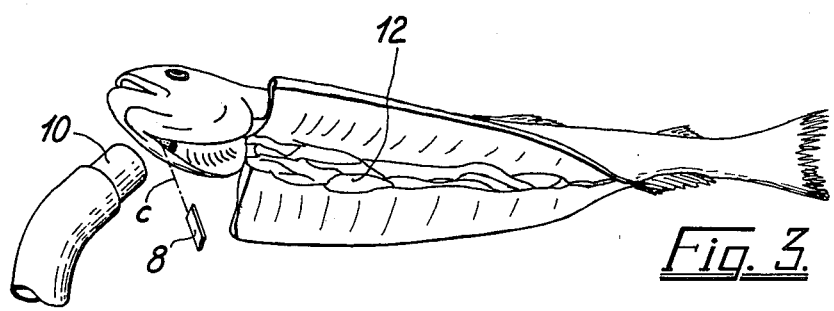
Figure 4:
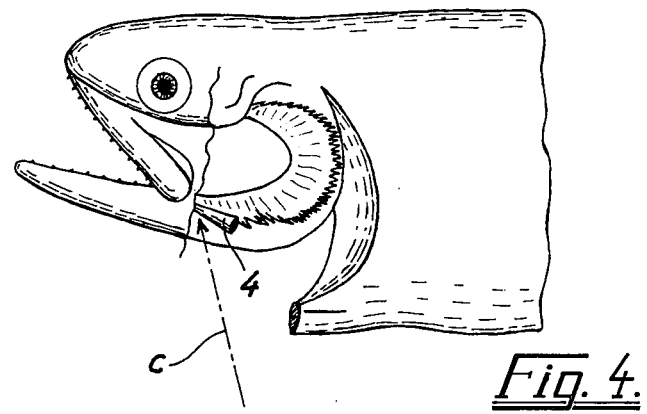

As a first working step there is made a cross incision along the dotted line *a* as shown in FIG. 1, i.e. crosswise approximately along the rear edge of the gill cover blades (operculum) whereby the lower body portion 6 joined to the tongue arch will be cut over and the rear edges of gill arches and some entrail parts be loosened. When the body portion 6 is cut the entire fish head will be tilted upwardly by the pressing force of the member 2 so that the front portion 4 of the body portion 6 still remaining in connection with the head will be moved away from the main portion 6 as illustrated in FIG. 2. Thereafter a longitudinal incision is made along the line *b* shown in FIG. 2 and the fillets are opened as shown in FIG. 3. Thereafter (or if desired prior thereto) the remaining portion 4 together with the lower ends of the gill arches (see also FIG. 4) are cut free of the tongue arch by means of a chisel 8 moved along the inclined lince *c*.

Thereafter a sucking mouth piece 10 is moved into contact with the gills and entrails immediately behind the head and is moved downstream of the opened fish whereby the gills and entrails 12 are effectively sucked away. The connection between the upper ends of the gill arches and the head (see FIG. 4) may be broken solely by the sucking action, so it is not necessary to precut the fish at this place. However, in order to further safeguard the cleaning it is preferred to let the mouth piece 10 mechanically engage this upper fastening area of the gill arches so as to effectively loosen the gill arches by a scraping action.

Figure 5:
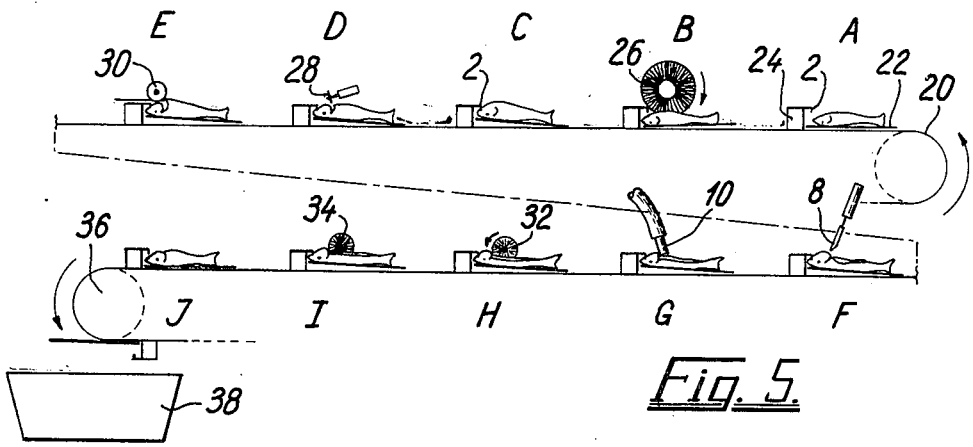
FIG. 5 is a schematic illustration of the progress of the method as carried out in a fish cleaning machine according to the invention.

A machine for cleaning the fish according to these principles is shown schematically in FIG. 5. It comprises a conveyor chain 20 provided with a plurality of fish holding structures each comprising a raisable support 22 and a stationary structure 24 carrying the pointed pressure member 2; these holding structures will be described in more detail below with reference to FIG. 6.

Figure 6:
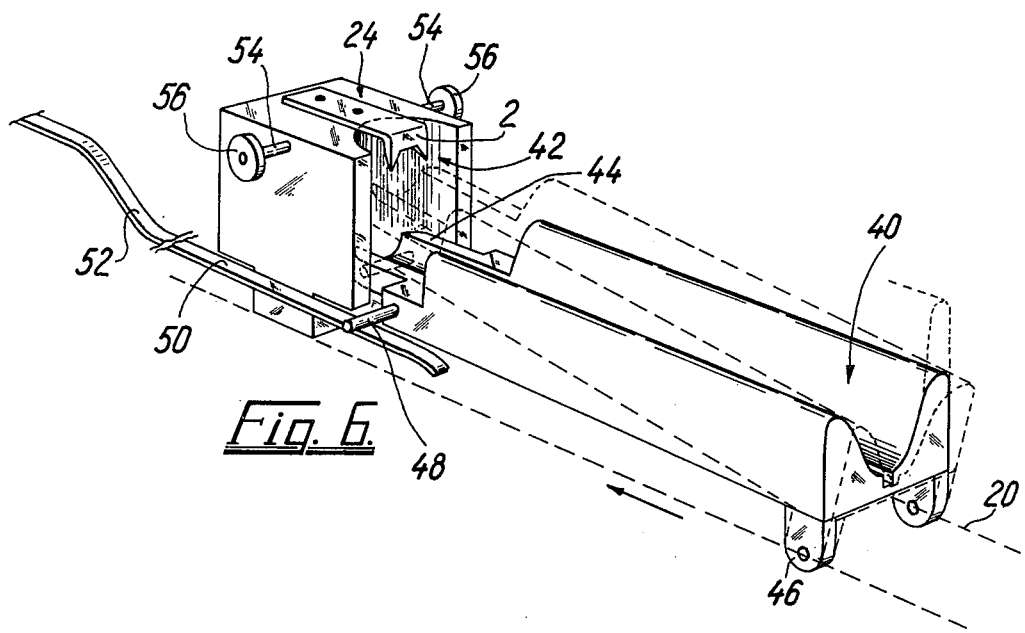
FIG. 6 is a perspective view of the fish holding means used in the machine
Figure 7:
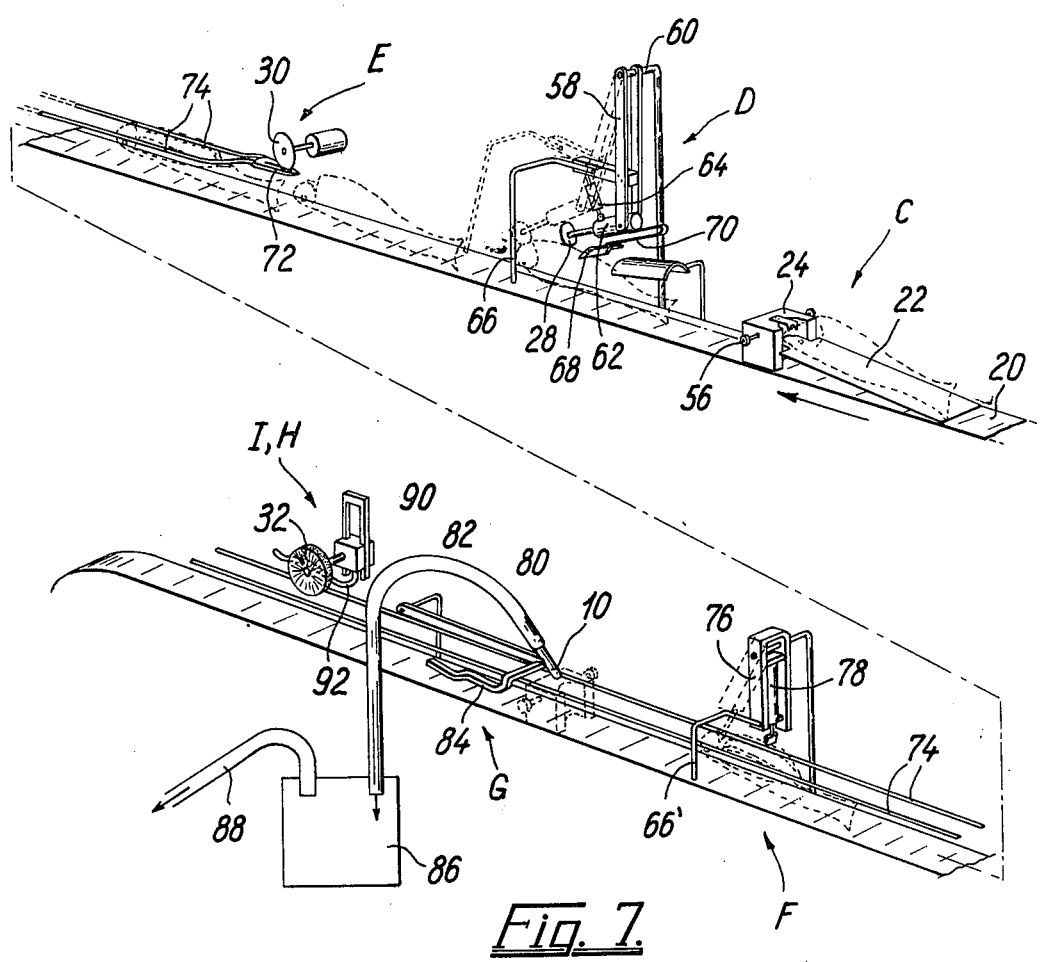
FIG. 7 is a schematic perspective view of some of the working stations in the machine.

The holding structures pass different stations A, B, C, D, E, F, G, H, I, and J in the machine, and these stations will first be briefly described and thereafter more detailed described with further reference to FIGS. 6 and 7.

In station A the operator places a fish on the support 22 in the position shown, i.e. with the fish lying on its back with its head close to the stationary holder structure 24 on the belt 20.

In station B a soft rotating brush 26 serves to engage the fish so as to press it forwardly against the structure 24.

In station C the front end of the support 22 is raised, whereby the head of the fish is clamped between the support and the pointed holding member 2.

In station D the first incision along the line a (FIG. 1) is made by means of a rotating saw blade 28.

In station E or by the passage of station E the longitudinal incision along the line b (FIG. 2) is made by means of a rotating saw blade 30, and the fillets are forced away from each other, whereafter they are held in this open position by means of guiding or holding rails (not shown in FIG. 5).

In station F the chisel 8 (FIG. 3) is operated to cut through the lower ends of the gill arches.

In station G the fish is moved past the sucking mouth piece 10 whereby the gills and the entrails are removed from the fish.

In station H a rotary brush 32 serves to brush away any remaining impurities from the opened body cavity of the fish.

In station I the same treatment is repeated by means of a rotary brush 34.

In station J the support 22 is lowered so as to make the fish free of the engagement with the hook member 2.

When after the passage of station J the holding structure 22,24 on the chain 20 passes an end sprocket 36 the holding structure will be turned upside down whereby the fish now released from the holding structure will fall down into a receptable 38 which may also be a conveyor for bringing the fish to a suitable delivery position.

The fish holding structure is schematically shown in FIG. 6. The support 22 is made as a block having a longitudinal groove 40 in which the fish may be placed in a well supported or well defined upside down position. The structure 24 is a block having a vertical groove 42 which receives a narrowed front end portion 44 of the support 22. The hook member 2 is mounted so as to project over and down into the groove 42 at the top thereof. The block 24 is mounted rigidly on a chain link (not shown) of the chain 20 while the support 22 is hinged to the chain at its rear end at 46. The front end thereof is provided with a laterally projecting pin 48 which is slidingly carried on a rigid cam 50 extending along the path of the chain 20 so as to be able to lift the front end of the support in station C, where the cam has an inclined portion 52, and to thereafter maintain the support in its raised position until it reaches station J, in which the support is lowered. The pin 48, of course, may be provided with a roller. The block 24 is provided with laterally projecting pins 54 carrying rollers 56 which serve to control the movement of some of the working tools described hereinbelow.

In station A it is sufficient for the operator to place a fish in the groove 40 of the support 22, While in known machines the fish shall be hooked in rather accurate positions it is here sufficient almost to throw the fish into the groove 40, the only condition being that the fish shall lie on its back and have its head facing the block 24. For this reason it will even be possible to use automatic fish supply means. As the support structure advances to or through station B the fish will automatically be brought into a well defined position with its head pressed gently against the wall of the block 24, since the brush 26 has a peripheral velocity which is higher than the advancing velocity of the chain 20, so the arrangement is usable also for continuous non-intermittent operation of the machine. As soon as the fish has passed the brush 26 the support 22, in station C, is raised by virtue of the cam portion 52, whereby the head of the fish is firmly clamped between the hook 2 and the support front end 44.

The brush 26 may be substituted by other means of which the most simple would be to let the support 22 be downwardly inclined at least until it is raised, if desired in connection with an inclined section of the chain 20, whereby the fish will simply slide into its correct position. Instead of the support being raisable, means may be provided for correspondingly lowering the hook 2. The raised position of the support is schematically shown at station C also in FIG. 7.

Also station D is schematically shown in FIG. 7. It comprises an overhead structure 58 which is swingably supported in a rigid cross shaft 60 and serves as a suspension means for a rotational motor 62 driving the saw blade 28. This motor, in its turn, is pivotally suspended in the structure 58, controlled by an air cylinder 64 in such a manner that the saw blade 28 may be lowered and raised. The structure 58 has an arm 66 the lower end of which is situated in the moving path of the roller 56 of the fish holding unit 22, 24 whereby as this unit passes the station D, the entire structure 58, 62 is swung forwardly a certain distance following the travel of the holding unit and then swung back again by the gravity when the roller 56 leaves the arm 66. A holding plate 68 is mounted on a leaf spring 70 so as to hold down on the fish just in front of the rotating saw blade 28. The cylinder 64 is controlled so as to start lowering the saw blade as soon as the structure 58 starts swinging forwardly, whereby the incision along the line a (FIG. 1) will be made during continuous movement of the fish. The plate 68 will hold the fish also in lateral direction during the work of the saw blade. Of course, the saw blade should be raised by means of the cylinder 64 before the structure 58 swings back to its initial position. These movements may be controlled by suitably arranged sensor switches (not shown) or in any other convenient manner.

Station E is of more or less conventional design. The saw blade 30 works in a groove in a stationary counter holding member 72 from the rear end of which there extends a pair of opposed fillet holding rods 74 serving a fold out the fillets after the cutting and hold them in their folded out positions during the further movement of the fish through the machine (FIG. 3).

In station F there is provided an overhead swingable structure 76 similar to the structure 58 in station D and provided with a similar actuator arm 66'. Centrally in the structure 76 there is mounted an air cylinder 78 on the piston rod of which the chisel 8 is mounted. This cylinder is controlled so as to be actuated when it is brought into an inclined position corresponding to the desired inclined direction of the line c (FIGS. 3 and 4) and so as to retract the chisel immediately after its working stroke, prior to the structure 76 being released from the roller 56 on the fish holding unit. Thus, also this operation may be done during continuous movement of the fish.

In the following station G the said suction mouth piece 10 is mounted on the front end of a horizontal lever 80 the rear end of which is pivotally secured at 82 so as to allow the mouth piece 10 to move up and down. The lever 80 is connected with a cam member 84 adapted to cooperate with the holding unit roller 56 and shaped so as to lift the mouth piece 10 over the block 24 and the head of the fish and to lower it immediately after the passage of the head and thereafter let it follow the longitudinal outline of the upper body cavity wall of the fish. As mentioned, the mouth piece 10 should preferably be lowered abruptly behind the head so as to be able to scrape off the upper gill arch ends from their connection with the head. The mouth piece 10 is connected to a waste container 86 in which the necessary vacuum is maintained through a suction pipe 88 leading to a suitable vacuum source. Outside the operative periods of the mouth piece 10 the suction may advantageously be stopped, preferably by means of a retractable closing plate (not shown) mounted for direct cooperation with the outer opening of the mouth piece 10.

The stations H and I are similar and are in FIG. 7 represented by one station only. The rotating aftercleaning brush 32 (or 34) is driven by a motor 90, preferably, a hydraulic motor, which is in any convenient manner guided so as to be raisable and lowerable, and it is connected with a cam member 92 serving to raise and lower it in the required manner by the passage of the holding unit roller 56. In this or these stations water is supplied to the brushing area or to the brushes.

The fillet holding rods 74 stop after the last brushing station I, and in station J the support 22, as explained above, is lowered by means of the cam 50, whereafter the fish is let out from the machine.

FIG. 8 illustrates a preferred design of the station F, in which the chisel cylinder 78 with the chisel 8 is mounted on a carrier plate 100 which is secured to the swing arm 76 by means of screws 102 extending through horizontal slots 104 in the plate 100, whereby the chisel cylinder is fixed to the swing arm structure 76 in an adjustable manner, thus enabling the chisel 8 to be adjusted to series of fish of various sizes. The actuator arm 66' shown in FIG. 7 is constituted by a lever 66" which is pivotally secured at 106 to the swing arm 76 and connected to a stationary point 108 by means of a connector rod 110 in such a manner that when the arm 76 is swung forwardly the rod 110 will cause the lever 66" to pivot counterclockwise whereby the front end of the lever is raised. This front end is designated 112 and is engaged by the roller 56' of the fish holder structure as this is advanced through the station F to thereby swing the arm 76 as described above. At the lower end of the front end 112 there is provided a notch 114 in the lever 66", and it will be understood that as the lever end is raised during the operational movement of the chisel arrangement the roller 56' will first engage the lever front end 112 and then, as this end is raised, engage the bottom of the notch 114 whereby the lever 66" and therewith the arm 76 and the chisel 8 is caused to move rearwardly a short distance. This happens while the chisel 8 assumes its advanced operative position in which it has cut through the gill archs and by the rearward movement of the chisel 8 it is obtained that the parts to be cut off are additionally torn away from the cutting area, whereby they are effectively loosened from the fish. The bottom stop position of the chisel may be adjustable e.g. by means of a screw 116.

During the further forward pivotal movement of the chisel structure, upon retraction of the chisel 8, the front end of the lever 66" will be further raised, until it is disengaged from the roller 56', whereafter the entire structure swings rearwardly by the gravity into its initial position, now ready to treat the following fish. Preferably a brake cylinder 118 is arranged for damping this return movement.

Also the fish holder structure is shown more detailed in FIG. 8. The support block 22 is hinged at 46 to the chain 20, and the roller fitted support pin 48' is arranged underneath the block 22 in the space between the two parallel chains 20. In the embodiment shown the control rollers 56' are not mounted direct on the block member 24, but on opposed bracket plates 120 each joined to a chain link next to the links to which the block member 24 is secured.

However, it will be readily understood that numerous other modifications will be possible within the scope of the invention.

What is claimed is:

1. A machine for automatically cleaning fish of the type to be sold with a head of the fish remaining on a fish body, the machine comprising a row of fish holders each operable to receive a fish with a belly side thereof exposed, said fish holders being movable past a plurality of treating stations including a head cutting station, said head cutting station including a cross cutting means for making a cross incision in a lower body portion of the fish adjacent a rear end of the head of the fish, a belly cutting station including means for cutting the fish lengthwise so as to open the belly thereof, and a cleaning station including means for removing the gills and entrails from the opened fish, characterized in that said cross cutting means are arranged so as to make said first incision approximately along a lower and rear end of gill blades of the fish, and in that a second cross cutting station is arranged between said head cutting station and said cleaning station, said second cross cutting station comprising cutting means operable to cut lower ends of gill arches and clavigulae of the fish approximately where these are joined to the tongue arch of the fish, said cutting means of said second cross cutting station are constituted by a chisel which is narrow enough to be able to pass between the gill cover blades of the fish without causing substantial damage to the gill cover blades, the chisel being reciprocable between a retracted position and an advanced position in which the chisel cuts through the gill arches and the clavigulae.

2. A machine according to claim 1, characterized in that the chisel is guided so as to carry out a short rearward movement relatively to the fish immediately after completion of its working stroke to said advanced position.

3. A machine for automatically cleaning fish of the type to be sold with a head of the fish remaining on a fish body, the machine comprising:

a row of fish holders each operable to receive a fish with the belly side thereof exposed, said fish holders being movable past a plurality of treating stations including a head cutting station, said head cutting station including a cross cutting means for making a cross incision in a lower body portion of the fish adjacent a rear end of the head of the fish, a belly cutting station including means for cutting the fish lengthwise so as to open a belly thereof, and a cleaning station including means for removing gills and entrails from the opened fish, characterized in that said cross cutting means are arranged so as to make said first incision approximately along a lower and rear end of gill blades of the fish, and in that a second cross cutting station is arranged between said head cutting station and said cleaning station, said second cross cutting station comprising cutting means operable to cut lower ends of gill arches and clavigulae of the fish approximately where these are joined to the tongue arch of the fish, and in that the means for removing the gills and the entrails are constituted by a suction nozzle which is movable longitudinally along a belly wall of the fish.

4. A machine according to claim 3, characterized in that the suction nozzle is movably arranged perpendicularly to a path of travel of the fish holders, and in that control means are provided for moving the nozzle into operative engagement with cut gill arches just behind the head of the fish and to thereafter move the suction nozzle rearwardly along the fish.

5. A machine according to claim 3, characterized in that said second cross incision is made by a non-rotatable cutting tool which is moved through a space between the gill cover blades at an acute angle with the length direction of the fish rearward from the head thereof.

6. A machine according to claim 5, characterized in that the suction nozzle is moved in operative engagement with the gills and entrails.

7. A machine according to claim 5, characterized in that the suction nozzle is moved perpendicularly to the path of movement of the fish so as to generally follow the curvature of the upper belly cavity wall of the fish.

8. A machine according to claim 5, characterized in that the suction nozzle is brought into operative engagement with the gills and entrails immediately behind the said second cross incision, and is thereafter moved rearwardly along the opened belly.

9. A machine for automatically cleaning fish comprising:

a plurality of holding means for receiving a fish and holding the same with a belly side up,
a plurality of stations for sequentially treating the fish disposed in said holding means,
means for conveying the holding means through said treating stations,
said treating stations including a first cutting station having a means for making a first cross incision in a lower body portion of the fish approximately along a lower and rear end of gill blades of the fish,
a belly cutting station including means for cutting the fish lengthwise so as to open the belly thereof,
a second cutting station arranged after the first cutting station including means for making a second cross incision subsequent to said first cross incision, said means for making said second cross incision being independent of said means for making said first cross incision, said second cross incision cutting the lower end of gill arches and clavigulae approximately where these are joined to the tongue arch of the fish, said means for making said second cross incision includes a chisel, said chisel having a cross-sectional configuration so as to permit the same to pass between the gill cover blades of the fish without causing damage to such blades,
means for reciprocably mounting the chisel between a retracted position and an advanced position in which the chisel cuts through the gill arches and the clavigulae, and
a cleaning station including means for removing the gills and entrails from the opened fish.

10. A machine according to claim 9, wherein means are provided for guiding the chisel so as to carry out a short rearward movement relative to the fish immediately after completing a working stroke from the retracted position to the advanced position.

11. A machine according to claim 9, wherein said means for removing the gills and entrails include a suction nozzle, and means for moving said suction nozzle longitudinally along the belly wall of the fish.

12. A machine according to claim 11, wherein said suction nozzle is movably arranged perpendicular to the conveying means, and wherein control means are provided for moving the nozzle into operative engagement with the cut gill arches just behind the head of the fish and to thereafter move the suction nozzle rearwardly along the fish.

13. A machine according to claim 9, wherein said chisel mounting means includes a cylinder means operatively associated with said chisel for causing said chisel to be displaced between a retracted and advanced position, and wherein means are provided for guiding the chisel so as to carry out a short rearward movement relative to the fish immediately after completeing a working stroke from the retracted position to the advanced position.

14. A machine according to claim 13, wherein said guiding means includes a pivot arm mounted at the machine, means for mounting said cylinder means to said pivot arm, and wherein means are provided for pivoting said pivot arm and therewith said cylinder means in response to a movement of one of said holding means through said second cutting station.

15. A machine according to claim 14, wherein said means for pivoting said pivot arm includes an actuating lever pivotally mounted at a free end of said pivot arm, said actuating lever including an end portion engageable with a holding means, and wherein each of said holding means includes a means for causing a displacement of said actuating lever as the holding means moves through said second cutting station.

16. A machine according to claim 15, wherein said displacement causing means includes a roller means provided on each of said holding means, and wherein said actuating lever, said pivot arm and said chisel are arranged such that during an operational movement of said chisel by said cylinder means, said actuating lever is raised so as to permit engagement of said roller means with said end portion.

17. A machine according to claim 16, wherein said end portion of said actuating lever includes an end wall and a notch disposed beneath said end wall, and wherein said roller means first engages a bottom wall of said notch whereby the actuating lever and said pivot arm cause said chisel to carry out said short rearward movement.

18. A method for automatically cleaning fish of the type to be sold with a head of the fish remaining on the fish body, the method comprising the steps of:
   making a first cross incision in a lower body portion approximately along a rear edge of the gill blades of the fish,
   making a second cross incision in a lower head portion of the fish subsequent to said first cross incision so as to cut lower ends of gil arches and clavigulae approximately where joined to a tongue arch or urohyale of the fish,
   providing a longitudinal incision along an underside of the fish body so as to open a belly of the fish, and
   removing the gills and entrails by a suction nozzle moved relatively to the fish lengthwise of the opened belly in operative engagement with the gills and entrails.

19. A method according to claim 18, wherein the step of removing the gills and entrails comprises:
   moving the fish through a cleaning station, and
   moving the suction nozzle perpendicularly to a path of movement of the fish so as to generally follow the curvature of an upper belly cavity wall of the fish.

20. A method according to claim 19, wherein the step of removing the gills and entrails further comprises:
   bringing the suction nozzle into operative engagement with the gills and entrails immediately behind the second cross incision and thereafter moving the suction nozzle rearwardly along the opened belly.

21. A method for automatically cleaning fish of the type to be sold with a head of the fish remaining on a fish body, the method comprising the steps of:
   making a first cross incision in a lower body portion approximately along a rear edge of the gill blades of the fish,
   making a second cross incision in a lower head portion of the fish subsequent to said first cross incision so as to cut lower ends of gill arches and clavigulae approximately where joined to a tongue arch or urohyale of the fish, by moving a chisel through a space between gill cover blades at an acute angle to a length direction of the fish rearward from a head of the fish,
   providing a longitudinal incision along an underside of the fish body so as to open a belly of the fish, and
   removing gills and entrails from an opened belly of the fish by a suction nozzle moved relatively to the fish lengthwise of the opened belly in operative engagement with the gills and entrails.

22. A method according to claim 21, wherein the step of removing the gills and entrails comprises:
   moving the fish through a cleaning station, and
   moving the suction nozzle perpendicularly to a path of movement of the fish so as to generally follow the curvature of an upper belly cavity wall of the fish.

23. A method according to claim 22, wherein the step of removing the gills and entrails further comprises:
   bringing the suction nozzle into operative engagement with the gills and entrails immediately behind said second cross incision and thereafter moving the suction nozzle rearwardly along the opened belly.

* * * * *